(12) United States Patent
Meckes et al.

(10) Patent No.: US 7,871,317 B2
(45) Date of Patent: Jan. 18, 2011

(54) AIR EXIT GUIDANCE

(75) Inventors: Rüdiger Meckes, Berkenthin (DE); Wolfgang Rittner, Siblin (DE)

(73) Assignee: B/E Aerospace Systems GmbH, Lübeck (DE)

( * ) Notice: Subject to any disclaimer, the term of this patent is extended or adjusted under 35 U.S.C. 154(b) by 984 days.

(21) Appl. No.: 11/465,649

(22) Filed: Aug. 18, 2006

(65) Prior Publication Data

US 2007/0042701 A1 Feb. 22, 2007

(30) Foreign Application Priority Data

Aug. 19, 2005 (DE) .................. 10 2005 039 236

(51) Int. Cl.
*B60H 1/30* (2006.01)
(52) U.S. Cl. .................. 454/147; 454/71; 454/154; 454/155; 454/305
(58) Field of Classification Search .............. 454/71, 454/76, 145, 147, 152, 154, 155, 286, 323, 454/334, 305, 23; 181/214, 215, 247, 264; 239/270, 473; 251/117, 121

See application file for complete search history.

(56) References Cited

U.S. PATENT DOCUMENTS

| 2,596,909 A | * | 5/1952 | Ross et al. | ............... 454/73 |
| 2,672,806 A | * | 3/1954 | Vehige | ............... 454/76 |
| 2,830,523 A | * | 4/1958 | Vehige | ............... 454/323 |

FOREIGN PATENT DOCUMENTS

| DE | 1218892 | * | 6/1966 |
| EP | 1559648 A2 | | 8/2005 |

* cited by examiner

*Primary Examiner*—Steven B McAllister
*Assistant Examiner*—Seth Greenia
(74) *Attorney, Agent, or Firm*—McGlew and Tuttle, P.C.

(57) ABSTRACT

An air exit guidance which in particular is provided for arrangement in the personal service unit of an passenger aircraft. The guidance includes an air inlet and an air outlet as well as an adjustable throttle which is arranged at the inflow side of the air exit guidance.

20 Claims, 1 Drawing Sheet

AIR EXIT GUIDANCE

CROSS REFERENCE TO RELATED APPLICATIONS

This application claims the benefit of priority under 35 U.S.C. §119 of German Patent Application DE 10 2005 039 236.9-16 filed Aug. 19, 2005, the entire contents of which are incorporated herein by reference.

FIELD OF THE INVENTION

The invention relates to an air exit guidance, in particular for the arrangement in the personal service unit of a passenger aircraft.

BACKGROUND OF THE INVENTION

Common ventilation nozzles, as are for example arranged at present in the personal service units of passenger aircraft and passenger buses, as well as the dashboards of motor vehicles, create flow noises during use, which are perceived by many passengers to be unpleasant and annoying.

SUMMARY OF THE INVENTION

Against this background, it is the object of the present invention to create a simply constructed air exit guidance which is uncomplicated in its manufacture and is improved with regard to the emission of noise.

According to the invention, an air exit guidance is provided, in particular arranged in the personal service unit of a passenger aircraft or an air guidance system of a passenger aircraft or other vehicle is provided. The air exit guidance includes an air inlet, an air outlet and an adjustable throttle means, wherein the throttle means is arranged at the inflow side of the air exit guidance.

The inventive air exit guidance feature forms the end of the ventilation system on the downstream side, with which the passengers in a passenger aircraft or in a vehicle are supplied with a ventilation flow. In particular it is provided for the arrangement in the personal service unit of a passenger aircraft, but may for example also be arranged in corresponding installations of a passenger bus or motor vehicle. The air exit guidance comprises an air inlet and an air outlet. The air exit guidance is connected by channel to the ventilation system via the air inlet, and the air outlet forms the downstream-side end of the air exit guidance to the surroundings to be ventilated. Also, the air exit guidance comprises an adjustable throttle means, with which the air quantity which is let out at the air outlet, or the airflow, may be changed, in particular with which the air exit guidance may also be closed.

According to the invention, the throttle means is provided at the inflow-side of the air exit guide. With this arrangement, the throttle means within the air exit guidance is arranged at an as large as possible distance to the air outlet, and the flow path of the air from the throttle means to the air outlet is almost just as long as the flow path through the complete air exit guidance. This design has the advantage that the intensity of the sound caused by the throttle means and perceivable at the air exit, is reduced, since the air as the carrier of sound within the air exit guidance, proceeding from the throttle device as a sound source, has to cover a very large flow path up to the air outlet, wherein the sound intensity weakens on the way to the air outlet. A further advantage of this arrangement is the fact that with an air exit guidance installed in a fitting, for example in a personal service unit, the throttle means is arranged in a region which is located within the fitting or the personal service unit, which then also serves as an outer sound insulation feature.

In a further advantageous design, with the air exit guidance, several air guidance channels to the air outlet are provided downstream of the throttle device. The air outlet is advantageously formed by the exit openings of the air guidance channels themselves. The air guidance channels form the flow conduits from the throttle means to the air outlet to the surroundings. Preferably, the air guidance channels are arranged parallel to one another. The use of several air guidance channels has the advantage that the inner walls of the air guidance channels together form a larger surface onto which the airflow flows, than this would be the case for example with a single air guidance channel with a correspondingly large cross section. This is particularly advantageous since the air columns located in the air guidance channels, which are set into oscillation by the sonic excitation at the throttle means, come across a significantly larger friction surface at which friction losses arise, which are then taken from the sonic energy. The sound intensity reduces in this manner, i.e. the air guidance channels form a sound absorber.

Preferably, the air guidance channels are arranged in a manner such that the exit openings of the air guidance channels, which from the air outlet to the surroundings have such a distance to one another, that the air oscillations exiting at the exit openings superimpose outside the air exit guidance in a free jet, and by way of this mutually weaken one another, and in the most favorable case even cancel each other out.

The air guidance channels are advantageously designed as long as possible, since they form resonance channels, with which, with an increasing length, the natural resonances of the air columns oscillating therein are displaced into lower frequency regions, which given the same sonic pressure are perceived by the human ear to be quieter than higher frequency ranges.

It is known that with the sonic excitation at an edge onto which an airflow flows, the sound intensity as well as the frequency of the produced sound reduce with a decreasing flow speed. For this reason, the air inlet of the air exit guidance according to the invention usefully runs out into a diffuser space. The diffuser space is designed in a manner such that on the exit side of the air inlet, it forms a space with a flow cross section which is significantly reduced with respect to the air inlet, in which the flow speed is reduced at the exit side of the air inlet. Advantageously the diffusor space is arranged on the entry side of the throttle means, so that air whose flow speed is reduced with respect to the flow speed directly at the exit side of the air inlet, flows onto the throttle means.

The air inlet is preferably formed by several air inlet openings. These are preferably arranged parallel and offset to the air guidance channels. Advantageously, the air inlet openings are positioned in a manner such that they run into the diffuser space, at a distance to the air guidance channels. The air inlet openings are particularly preferably arranged such that the airflow led through the air inlet openings is not directed directly onto an edge located in the air exit guidance, in particular onto an edge of the throttle means. By way of this, a direct production of sound by the airflow exiting at the air inlet openings is prevented.

In one advantageous embodiment of the invention, the air inlet, the throttle means, the air guidance channels as well as the air outlet are arranged in a flow guidance component which is pivotably mounted in a mounting- and fastening element in any direction. The flow guidance component preferably contains the complete flow path from the air inlet to the air outlet. The mounting- and fastening element may be designed as a separate component for installation into a fitting, or for example the personal service unit of a passenger aircraft. Apart from this, it is also possible for the mounting- and fastening element to be part of a fitting or a personal service unit. The flow guidance component is arranged and mounted within the mounting- and fastening element such that it is pivotable with respect to the mounting- and fastening element about at least two pivot axes. In this manner, airflow exiting from the air outlet may be directed in a targeted manner.

Advantageously, the flow guidance component and the mounting- and fastening element form a ball joint for this. Thus the mounting- and fastening element may be designed in a manner such that it forms a hollow-ball-shaped bearing cup, in which the flow guidance component, which at least in sections has an outer shape which is complementary to the hollow-ball-shaped receiver space of the mounting- and fastening element, is arranged with a slight play.

The flow guidance component is preferably designed of two parts. Thereby, the flow guidance component comprises a first component on which the air inlet is provided, and a second component, in which the air guidance channels are arranged. In this manner, the complete flow guidance component may be manufactured in an inexpensive manner for example from two plastic injection molded parts, without further components being necessary.

Advantageously, the first and the second component are movable relative to one another, and form the throttle means. Thus the first component and the second component form a throttle valve, with which preferably the first component forms a closure body with which the flow cross section of the flow path from the air inlet to the air guidance channels may be changed.

The air guidance channels are particularly advantageously closable on the inflow side indirectly or directly by a wall of the first component. Preferably, the air guidance channels are arranged in the second single-piece component, which is movable such that on the one hand it may be moved into a position distanced to the inner wall of the first component and in which a flow path from the air inlet to the air guidance channels exists, and on the other hand may be moved into a position in which the second component sealingly bears on the inner wall of the first component and thus closes the air guidance channels on the inflow side.

In an advantageous manner, the first and the second component form the diffuser space in the assembled condition of the flow guidance component. The diffuser space is arranged in the flow guidance component in a manner such that it surrounds the air guidance channels preferably in an annular manner. For example, the second component may be designed in a pot-like manner, wherein the air guidance channels, proceeding from the middle of the inner base of the second component, extend in its longitudinal direction. The first component is preferably designed such that it covers the open pot end of the second component. The annular space which arises on assembly of the first and second component, thereby forms the diffuser space.

In a preferred embodiment, the first component is designed as an outer component in the form of a ball section. In this manner, the flow guidance component may be arranged in the mounting- and fastening element in the manner of a ball joint. It is further preferable to arrange a threaded stem in the inside of the first component, onto which the second component may be screwed in an adjustable manner. Thus the second component may be adjustable in the axial direction by way of rotation with respect to the first component.

Usefully, the second component has a handle with which the second component is movable relative to the first component in the direction of a middle axis of the flow guidance component. The handle thereby is arranged at a position of the air exit guidance which is easily accessible to the user. In a preferred embodiment, the handle is designed for rotating the second component with respect to the first component, wherein the second component is screwed on the first component in an adjustable manner.

The invention is hereinafter described by way of an embodiment example represented in the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
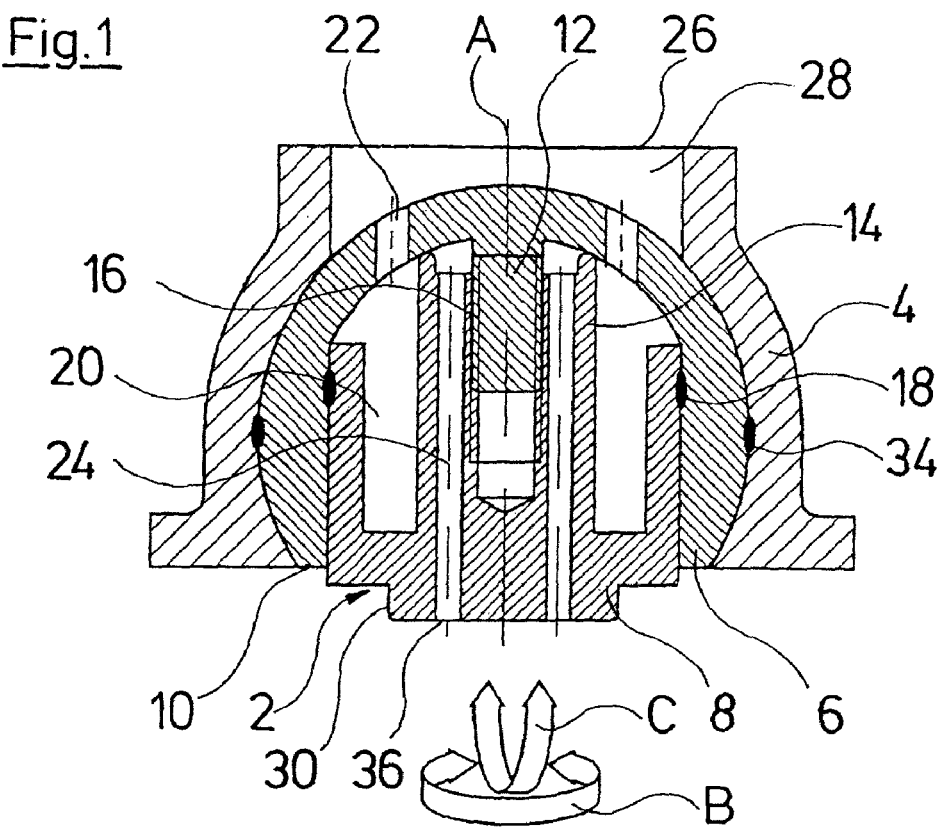
FIG. 1 is a sectioned view of an air exit guidance with a closed throttle means.

Referring to the drawings in particular, the air exit guidance system of the invention includes a flow guidance component 2 as well as a mounting and fastening part 4, in which the flow guidance component 2 is mounted. The flow guidance component 2 is formed in a two-part manner with a first component (ball part) 6 which receives a second component (actuator part) 8.

The first component 6 is designed in an essentially hollow manner and has an outer shape which corresponds to a ball with a cut-off spherical cap. The component 6 thus comprises a circular, open end-side 10. Proceeding from this end-side 10, the inner space of the component 6 is firstly designed in a cylindrical-hollow manner, in order then to run into a calotte-shaped, closed region. A threaded stem 12 extends on this calotte-shaped region of the inner space from the inner wall of the component 6 in the direction of the open end-side 10. Thereby, the threaded stem 12 has a longitudinal axis A which runs through the middle of the end-side 10.

The second component 8 is designed in a pot-like manner and has an outer diameter which corresponds to the inner diameter of the mounting- and fastening component 4 in its hollow-cylindrical region. The pot-like component 8 on the inside has a stem 14 which extends from the base of the component 8 and which is arranged centrally of the cylindrical outer wall and projects beyond this. A threaded pocket hole 16 is formed at the free end of the stem 14, into which hole the threaded stem 12 of the component 6 engages.

The threaded stem 12 is screwed into the threaded pocket hole 16 in the assembled condition of the flow guidance component 2. In an end position, the stem 14, as shown in FIG. 1, abuts with its end-side against the inner wall of the component 6 in its calotte-shaped region and bears on its inner wall in a sealing manner. In the assembled condition of the flow guidance component 2, the outer wall of the component 8 has a slight play with the inner wall of the component 6 in its hollow-cylindrical region. A sealing ring 18 which is arranged on the outside in the region of the free end of the outer wall of the component 8 thereby seals the component 6 with respect to the component 8.

A diffuser space 20 is formed within the components 6 and 8, which extends annularly around the stem 14 from the component 8 and is limited on the outside essentially by the outer wall of the component 8, and above its free end by the inner wall of the component 6, which is designed in a calotte-shaped manner.

Several recess 22 which form air inlet openings passing through the outer wall of the component 6 are distributed parallel to the middle axis A and annularly about the middle axis A, in the component 6. The recesses 22 with the flow guidance component 2 run out into the diffuser space 20 and specifically next to the stem 14. They form a flow connection from outside the flow guidance component 2 to the diffuser space 20.

Several air guidance channels 24 which form resonance channels are arranged in a circular manner about the threaded pocket hole 16 on the component 8. These air guidance channels 24 extend from the end-face of the stem 14 to the free end-face of the component 8 on the base, where they form exit openings 36. In each case, adjacent exit openings 36 thereby have a distance to one another, which is dimensioned such that the airflows exiting there during operation of the air exit guidance, and thus also the air oscillations, superimpose, and the air oscillations partly mutually cancel one another in this manner, by which means the sound emission is further reduced.

The mounting- and fastening component 4 is designed as a hollow body of revolution, open at two opposite sides. Proceeding from an air inlet 26, the inner space of the mounting- and fastening component 4 is firstly designed in a cylindrical manner, in order subsequently to widen in the shape of a ball segment. This section of the inner space of the mounting- and fastening component which is hollowed out in a ball-segment-shaped manner serves for receiving the flow guidance component 2. Accordingly, the ball-segment-shaped section of the mounting- and fastening element 4 is designed such that it corresponds to the spherical outer shape of the outer component 6 of the flow guidance component 2.

The flow guidance component 2 is mounted in the mounting- and fastening component 4 with little play in the manner of a ball joint, so that it is rotatable in all directions B, and is pivotable in a limited manner in any directions C. A sealing ring 34 is arranged between the outer wall of the component 6 as well as the inner wall of the mounting- and fastening part 4.

While the component 6 of the flow guidance component 2 in the installed condition terminates essentially flush with the mounting- and fastening component 4, the region around the free end-face at the base of the component 8 projects out of the mounting- and fastening component 4. A region of the component 8 is designed as a handle 30 in a shouldered manner, with which the component 8 may be rotated relative to the component 6, in order to be able to move the flow guidance component 2 from a closed position shown in FIG. 1, into the opened position represented in FIG. 2, or into any intermediate position.

The mounting- and fastening component 4 forms the outflow-side end of a ventilation system which is not represented in the figures, with which it is conductingly connected via the air inlet 26. Air flows from the ventilation system onto a region 28 extending from the air inlet 26 to the flow guidance component 2. Air firstly flows into the diffuser space 20 via the recesses 22. As shown in FIG. 1, the flow path of the air ends in the diffuser space 20 when the stem 14 is screwed onto the threaded stem 12 such that the end-face of the stem 14 sealingly bears on the inner side of the component 6.

Figure 2:
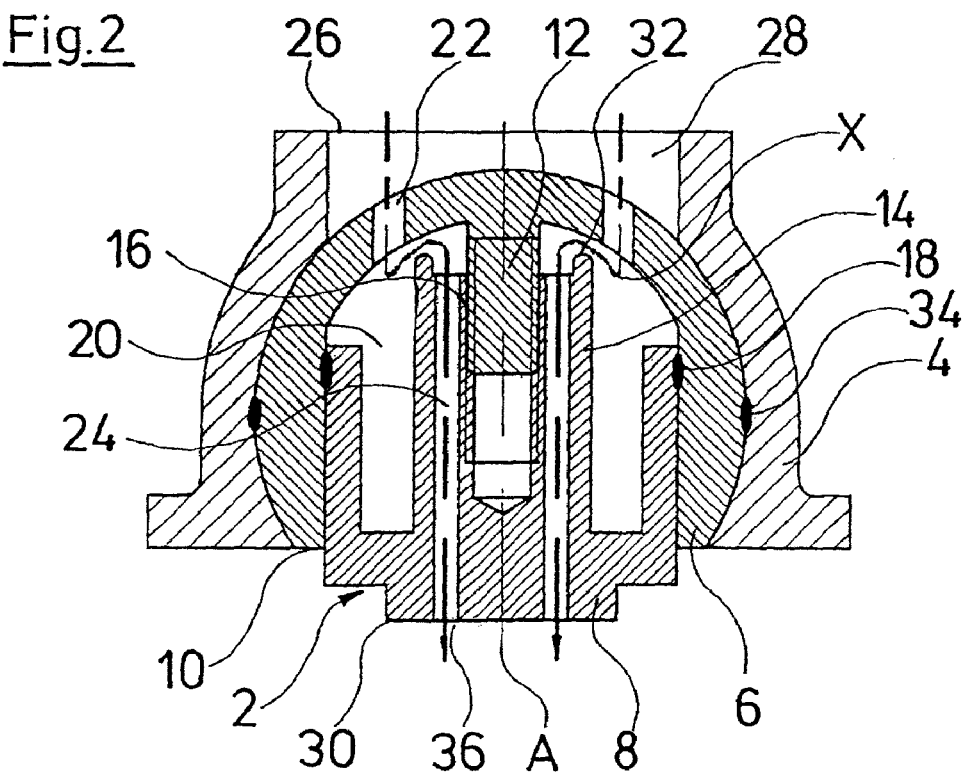
FIG. 2 is a sectioned view of the air exit guidance according to FIG. 1, with an opened throttle means.

By way of rotation of the handle 30 in a direction B, the component 8 may now be adjusted with respect to the component 6, such that as shown in FIG. 2, a gap 32 is formed between the end-face of the stem 14 and the inner side of the component 6. The gap 32 releases a flow path from the diffuser space 20 to the air guidance channels 24, so that with this position, a flow path X is created from the ventilation system via recess 22 to the diffuser space 20 and from there via the gap 32 to the air guidance channels 24 and further to the surroundings. Thus the stem 14 together with the inner side of the component 6 form a throttle means whose changeable throttle cross section is formed by the gap 32. The airflows exiting at the exit openings 36 of the air guidance channels 24 or the air quantity flowing out may be set by way of rotating the handle 30 and thus by way of changing the size of the gap 32, i.e. of the throttle cross section.

While specific embodiments of the invention have been shown and described in detail to illustrate the application of the principles of the invention, it will be understood that the invention may be embodied otherwise without departing from such principles.

LIST OF REFERENCE NUMERALS

2 flow guidance component
4 mounting- and fastening component
6 first component of 2
8 second component of 2
10 end-side
12 threaded stem
14 stem
16 pocket hole
18 sealing ring
20 diffuser space
22 recesses, air inlet openings
24 air guidance channels
26 air inlet
28 region
30 handle
32 gap
34 sealing ring
36 exit openings
A longitudinal, middle axis
B rotational directions
C pivot directions
X flow path

What is claimed is:

1. An air exit guidance for the arrangement in a personal service unit of a passenger aircraft, the air exit guidance comprising:

an air inlet with an air guidance inflow side;
an air outlet;
an adjustable throttle means arranged at said air guidance inflow side; and
plural air guidance channels extending to exit openings downstream of said throttle means, wherein said air inlet, said throttle means, said air guidance channels and said air outlet are arranged in a flow guidance component pivotally mounted in a mounting and fastening element for movement in any direction, said flow guidance component comprising a one-piece first component on which said air inlet is provided, and a second component in which said air guidance channels are arranged, wherein said first and second component are movable relative to one another and form said throttle means, said one-piece first component being a single part prior to assembly with said second component.

2. An air exit guidance according to claim 1, wherein said exit openings form said air outlet.

3. An air exit guidance according to claim 1, wherein said air inlet runs into a diffuser space.

4. An air exit guidance according to claim 3, wherein said diffuser space is arranged in front of the throttle means.

5. An air exit guidance according to claim 1, wherein said air inlet is formed by several air inlet openings arranged parallel to and offset from said air guidance channels.

6. An air exit guidance according to claim 1, wherein said flow guidance component and said mounting and fastening element form a ball joint.

7. An air exit opening according to claim 1, wherein said air guidance channels may be closed indirectly or directly on the inflow side by a wall of said first component.

8. An air exit opening according to claim 3, wherein said first and said second component in an assembled condition of the flow guidance component form said diffuser space, wherein said diffuser space surrounds the air guidance channels in an annular manner.

9. An air exit guidance according to claim 1, wherein said first component comprises an outer component in the form of a ball section with an inside having a threaded stem provided therein, on which said second component is screwed in an adjustable manner.

10. An air exit guidance according to claim 1, wherein the second component comprises a handle with which the second component is movable relative to said first component in a direction of a middle axis A of the flow guidance component, by way of rotation.

11. An air exit guidance device comprising:
a support component with an airflow region;
a one-piece first part defining an air inlet providing an air inlet from said airflow region to an air guidance inflow side; and
a second part defining an air outlet, said second part being movably connected to said first part to form an adjustable throttle arranged at said air guidance inflow side between said inlet and said outlet, wherein said second part is movable from a closed position to an open position, said second part comprising a first axially extending portion and a plurality of air guidance channels, said one-piece first part being a one-piece component prior to said second part being movably connected thereto, said first axially extending portion having a first axially extending inner surface, said first axially extending inner surface defining at least a portion of one of said air guidance channels and at least a portion of another one of said air guidance channels, said first part comprising a top portion, said top portion defining a plurality of recesses, said plurality of recesses forming said air inlet, each of said recesses being parallel to at least one of said plurality of air guidance channels, said first axially extending portion being in contact with said top portion with said second part in said closed position, said first axially extending portion being located at a spaced location from said top portion to define a gap with said second part in said open position, wherein fluid passes through one of said recesses, said gap and one of said plurality of channels to define a first air flow path and fluid passes through another one of said recesses, said gap and another one of said plurality of channels to define a second air flow path.

12. An air exit guidance according to claim 11, wherein said plurality of air guidance channels extend to exit openings downstream of said throttle means, said exit openings forming said air outlet.

13. An air exit guidance according to claim 11, wherein said first part and said second part define an air diffuser space with said air inlet opening into said diffuser space on said air guidance inflow side, said diffuser space being arranged upstream of said throttle with respect to a direction of air flow from said inlet to said outlet, said diffuser space being located adjacent to at least one of said air guidance channels, said diffuser space being in communication with at least one of air guidance channels with said second part in said second position, said second part comprising a second axially extending portion, said second axially extending portion engaging said first part, said first axially extending portion and said second axially extending portion and a portion of said first part defining said diffuser space.

14. An air exit guidance according to claim 12, wherein said recesses are offset from said air guidance channels.

15. An air exit guidance according to claim 11, wherein said support component is a mounting and fastening element and said first part and said second part are mounted in said mounting and fastening element for pivoting movement in any direction.

16. An air exit guidance according to claim 15, wherein said first component comprises an outer component in the form of a ball section with an inside having a connection part to which said second component is attached in an adjustable manner.

17. An air exit guidance according to claim 15, wherein the second component comprises a handle with which the second component is movable relative to said first component in a direction of a middle axis, by way of rotation.

18. An air exit guidance device comprising:
a support component with an airflow region;
a one-piece ball part with an outer ball surface and an interior air guidance inflow side, said ball part having an air inlet passage from said airflow region to an air guidance inflow side, said ball part having a plurality of recesses, said recesses defining said air inlet passage, said ball part having a center longitudinal axis and an upper portion, said plurality of recesses being arranged about said center longitudinal axis on said upper portion of said ball part, said ball part having a longitudinally downward extending portion;
an actuator part including a plurality of an air guidance channels extending to exit openings, said actuator part being rotatably mounted on said ball part to form an adjustable throttle between said inlet and said outlet, said one-piece ball part being a one-piece component prior to said actuator part being rotatably mounted thereon, wherein said actuator part is movable from a closed position to an open position, said ball part and said actuator part cooperating to form a diffuser space upstream of said throttle with respect to a direction of air flow from said inlet to said outlet, said actuator part having a first inner actuator part portion, said first inner actuator part portion having a first inner actuator part surface extending parallel to said center longitudinal axis, said actuator part comprising a second inner actuator part portion located in a radially inward direction with respect to said first inner actuator part portion, said second inner actuator part portion being arranged coaxially with said longitudinally downward extending portion, said second inner actuator part portion having a second inner actuator part portion outer surface and a second inner actuator part portion inner surface, said second inner actuator part portion outer surface and said second inner actuator part portion inner surface extending parallel to said center longitudinal axis, said second inner actuator part portion inner surface being in contact with said longitudinally downward extending portion, said second inner actuator part portion outer surface and said first inner actuator part surface defining a plurality of air guidance channels, said first inner actuator portion having an upper end portion, said upper end portion being in contact with a portion of said ball part with said actuator part in said closed position, said air guidance channels not being in communication with said air inlet with said actuator part in said closed position, said upper end portion being located at a spaced location from said ball part with said actuator part in said open position, wherein said upper end portion and at least a portion of said upper portion of said ball part define a gap with said actuator part in said open position, wherein fluid passes through one of said recesses, said gap and one of said air guidance channels to define a first air flow path with said actuator part in said open position, said fluid passing through another one of said recesses, said gap and another one of said air guidance channels to define a second air flow path with said actuator part in said open position.

19. An air exit guidance according to claim 1, wherein said second component is movable from a closed position to an open position, said second component comprising a first axially extending portion, said first axially extending portion having a first axially extending inner surface, said first axially extending inner surface defining at least a portion of one of said air guidance channels and at least a portion of another one of said air guidance channels, said first component comprising a top portion, said top portion defining a plurality of recesses, said plurality of recesses forming said air inlet, each of said recesses being parallel to at least one of said plurality of air guidance channels, said first axially extending portion being in contact with said top portion with said second component in said closed position, said first axially extending portion being located at a spaced location from said top portion to define a gap with said second component in said open position, wherein fluid passes through one of said recesses, said gap and one of said plurality of channels to define a first air flow path and fluid passes through another one of said recesses, said gap and another one of said plurality of channels to define a second air flow path with said second component in said open position.

20. An air exit guidance according to claim 18, wherein said ball part and said actuator part define an air diffuser space with said air inlet passage into said diffuser space on said air guidance inflow side, said diffuser space being arranged upstream of said throttle with respect to a direction of air flow from said inlet to said outlet, said diffuser space being located adjacent to at least one of said air guidance channels, said diffuser space being in communication with one of said air guidance channels with said actuator part in said open position, said actuator part comprising an outer axially extending portion, said outer axially extending portion being in contact with said ball part, said outer axially extending portion being located in a radially outward direction with respect to said first inner actuator part portion, said first inner actuator part portion and said outer axially extending portion and a portion of said ball part defining said diffuser space.

* * * * *